United States Patent [19]

Wenrick

[11] 4,010,297
[45] Mar. 1, 1977

[54] COMPOSITE DECORATIVE TRIM STRIP FOR AUTOMOBILE SIDE BODIES

[75] Inventor: Brian A. Wenrick, Dayton, Ohio

[73] Assignee: Protective Treatments, Inc., Dayton, Ohio

[22] Filed: Feb. 23, 1976

[21] Appl. No.: 660,005

[52] U.S. Cl. .................................. 428/31; 428/41; 428/77; 428/189; 52/716; 293/1; 293/62

[51] Int. Cl.² ...................... B32B 7/06; B32B 3/30; B60R 13/04; B61F 19/04

[58] Field of Search ............ 428/31, 40, 41, 77–78, 428/189; 293/1, 62; 52/716

[56] References Cited

UNITED STATES PATENTS

| | | | |
|---|---|---|---|
| 3,439,950 | 4/1969 | Kunevicius | 428/40 X |
| 3,687,792 | 8/1972 | Ruff | 52/716 X |
| 3,687,794 | 8/1972 | Shanok et al. | 428/189 X |
| 3,770,545 | 11/1973 | Jackson | 52/716 X |

*Primary Examiner*—Philip Dier
*Attorney, Agent, or Firm*—Dressler, Goldsmith, Clement, Gordon, & Shore, Ltd.

[57] ABSTRACT

A composite trim strip structure comprising two adhesively bonded, non-coextensive body portions, the first body portion being a narrow strip having decorative longitudinal side strips and a second, wider body portion adapted to receive the first body portion and form additional, parallel, longitudinally decorative strips on either side of the first body portion. Each body portion is backed with elastomeric adhesive layers. When the trim strip is assembled and adhered to the side of a car, the plural adhesive layers serve to distribute impact force and the trim strip better resists separation from the car when impacted.

16 Claims, 6 Drawing Figures

U.S. Patent   Mar. 1, 1977   4,010,297
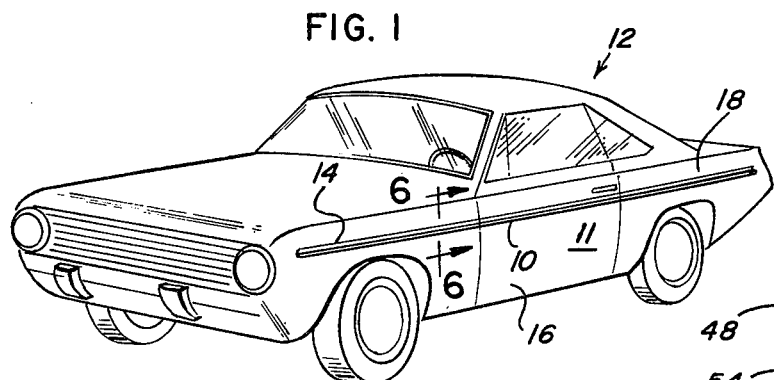
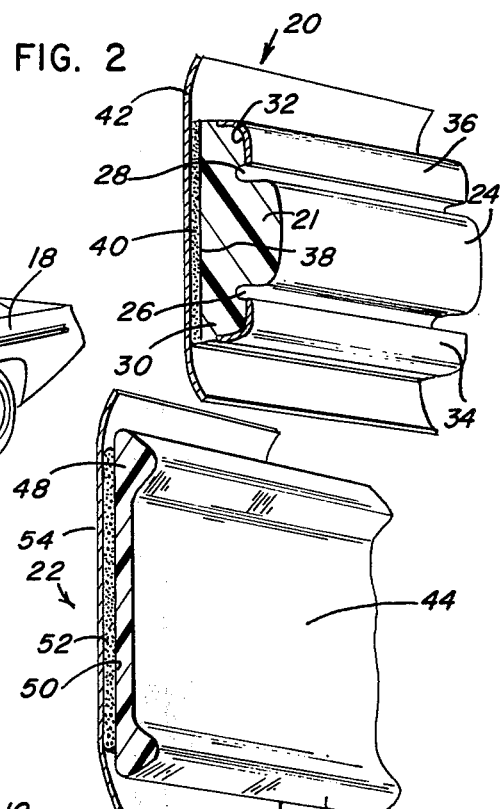
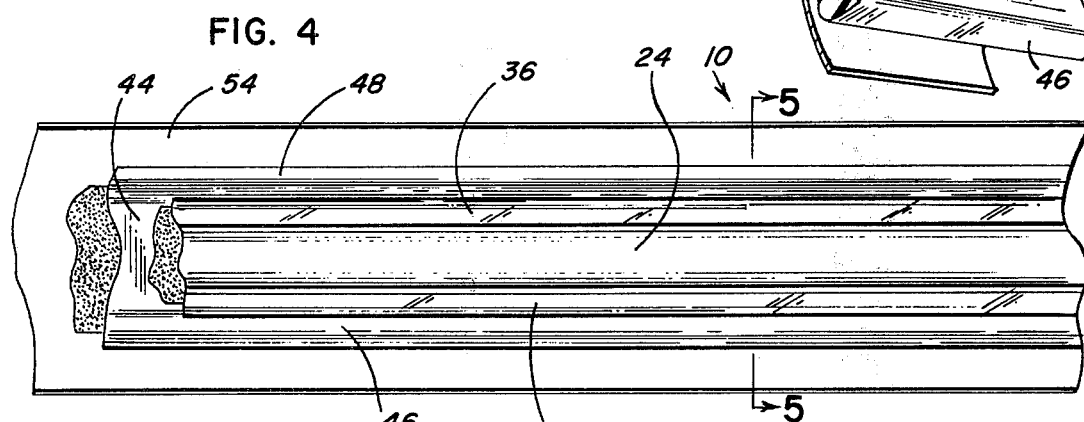
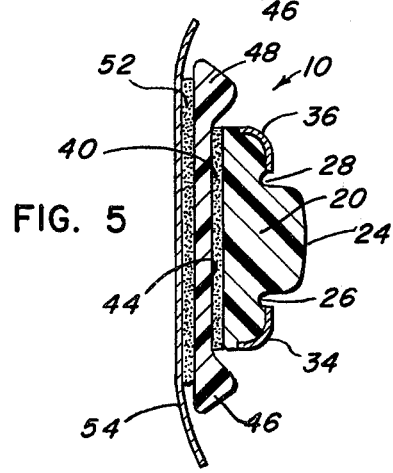
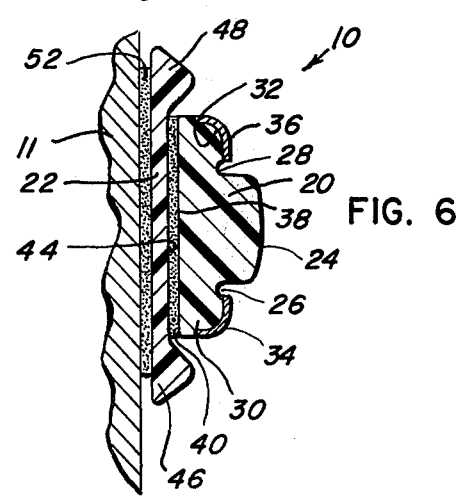

COMPOSITE DECORATIVE TRIM STRIP FOR AUTOMOBILE SIDE BODIES

BACKGROUND OF THE INVENTION

Trim strips of various configurations have been used for years in the automotive industry as a means of achieving the desired decorative effects on the interior of an automobile and for protective purposes on the exterior of the automobile. In recent years, increasing emphasis has been placed on achieving various decorative effects on automobile exteriors as well as providing improved trim strips which can be adhesively secured to the body of the automobile in a manner which resists separation from the car when impacted.

While the prior art has addressed itself to trim strips which are adapted for use to decorate various structures, but especially automobile side bodies, there exists a need for an improved trim strip which can be adhesively secured to the surface to be decorated, and which better resists separation when impacted, as well as provides a means for custom decorating such surfaces. The present invention provides such a trim strip.

SUMMARY OF THE INVENTION

The trim strip of this invention is a composite trim strip constituted by two longitudinally extending adhesively bonded plastic body portions which are preferably laterally non-coextensive. The first body portion is desirably of narrow width and of a first color, and this first body portion can include contrasting decorative longitudinal side strips. The second body portion is desirably wider than the first and is preferably of a second color. The second body portion is adapted to adhesively receive the narrow first body portion and thus form additional, parallel, longitudinal decorative strips on either side of the narrow plastic body portion. Each body portion is backed with an adhesive layer, preferably an elastomeric adhesive layer, and can be stored separately to simplify storage of multiple combinations. When the two body portions are adhesively assembled and the trim strip is adhesively adhered to the side of a car, the two elastomeric layers serve to distribute impact force and the trim strip better resists separation from the car when impacted.

The two body portions may be the same or of different color, depending on the desired decorative effect. The parallel longitudinal side strips of the narrow plastic body portion are preferably metallized strips and polyvinyl chloride plastic is the plastic of preference.

When the first or outer body portion of the trim strip is impacted, the impact force is transmitted to both resilient adhesive layers and in turn to the side of the vehicle body. Thus, the two strips and the two resilient adhesive layers serve to distribute the impact force, enabling the trim strip to better resist separation from the vehicle body when impacted.

BRIEF DESCRIPTION OF THE DRAWINGS

The present invention will be further illustrated by reference to the following detailed description taken in conjunction with the accompanying drawings in which:

FIG. 1 is a perspective view of an automobile with a trim strip of this invention secured to the side surface thereof;

FIG. 2 is a sectional perspective view of the first body portion of the trim strip of this invention;

FIG. 3 is a sectional perspective view of the second body portion of the trim strip of this invention;

FIG. 4 is a fragmentary plan view of a segment of a trim strip in accordance with this invention, the trim strip being mounted on a paper support;

FIG. 5 is a sectional view of the trim strip taken along lines 5—5 of FIG. 4; and FIG. 6 is a sectional view of a trim strip taken along line 6—6 of FIG. 1.

DETAILED DESCRIPTION OF PREFERRED EMBODIMENTS

Referring now to the drawings, in FIG. 1, trim strip 10 is shown in position on the side surface 11 of a vehicle such as automobile 12. While trim strip 10 can be placed at various points along side surface 11, it is preferred that the trim strip 10 extend from front fender 14, across door 16 and substantially along rear fender 18.

Turning to FIGS. 2 and 3, trim strip 10 is preferably constructed of two adhesively bonded, laterally non-coextensive body portions: first or upper body portion 20 and second or lower body portion 22. First body portion 20, in one preferred embodiment, has a narrow plastic body portion 21 of a first color. While the preferred plastic material is polyvinyl chloride, the plastic material may be of any of several flexible impact resistant plastics. Exemplary plastics are polyvinylidene chloride, nylon, cellulose acetate butyrate, polyurethanes, or chlorinated polyethylene, which are cited merely by way of illustration. It is to be understood that any suitable thermoplastic material or pigmented plastic can be utilized.

The plastic body portion 21 is normally extruded in conventional manner to whichever shape is desired. In one preferred embodiment, first body portion 20 has an upper surface 24 which is visible as the outer surface when the trim strip is assembled and secured to automobile 12. Longitudinally disposed, parallel spaced apart channels 26 and 28 define shoulder portions 30 and 32 of body portion 20. Longitudinally decorative strips 34 and 36 can be adhered to shoulder portions 30 and 32, respectively, for decorative purposes. Strips 34 and 36 are preferably metallic, or metallized strips.

The lower surface 38 of first body portion 20 is preferably completely flat, however, it may deviate from perfect flatness and be somewhat concave or convex. However, as lower surface 38 is received by and adhered to upper surface 44 of second body portion 22, the two surfaces must either both be flat or be of compatible configurations.

An underlying resilient adhesive layer 40 is provided to secure the lower surface 38 of body portion 20 to the upper surface 44 of body portion 22. A non-adhesive layer 42 preferably of strippable paper is placed over the outer surface of adhesive layer 40 for storage purposes.

Referring to FIG. 3, second or lower plastic body portion 22 is preferably wider than first or upper body portion 20 and can be the same, or a different color than body portion 20. Body portion 22 has upper surface 44 which is adapted to receive lower surface 38 of body portion 20. Longitudinally disposed, parallel, spaced-apart shoulder portions 46 and 48 of body portion 22 form a second pair of longitudinally extending, spaced apart decorative strips on either side of strips 34 and 36 of body portion 20.

Body portion 22 has an underlying resilient adhesive layer 52 which serves to adhere lower surface 50 of body portion 22 to automobile 12. Strippable non-adhesive layer 54 overlies adhesive layer 52. The wider body portion provides better adhesion to side surface 11 of automobile 12 because of the concomitant wider resilient adhesive layer which affords a greater cohesive area between the trim strip and the vehicle body.

Referring now to FIG. 4, to assemble trim strip 10, strippable non-adhesive layer 42 is removed from body portion 20 and lower surface 38 of body portion 20 is securably affixed to upper surface 44 of body portion 22 by resilient adhesive layer 40. Metallized strips 34 and 36 provide decorative surfaces on either side of upper surface 24 of body portion 20. Shoulder portions 46 and 48 provide additional decorative strips on either side of metallized strips 34 and 36. These shoulder portions can be the same or a different color than surface 24.

The construction of trim strip 10 prior to its being adhered to a vehicle surface is further illustrated in FIG. 5. When upper or first body portion 20 is affixed to lower or second body portion 22, the trim strip 10 includes two resilient, preferably elastomeric adhesive layers 40 and 52 respectively. While any suitable adhesive material can be utilized, one feature of this invention is to provide two energy-absorbing adhesive layers which serve to distribute impact force. Thus, when trim strip 10 is adhesively assembled and adhered to the side surface 11 of automobile 12, the two elastomeric layers serve to distribute impact force and thus to better resist separation from the car when the first or upper body portion 20 is impacted. In order to adhere trim strip 10 to a vehicle body, non-adhesive layer 54 is removed and the trim strip 10 is adhered to the vehicle body in the conventional manner, as shown in FIG. 6.

By fabricating the trim strip 10 in two portions, upper body portion 20 and lower body portion 22, there has been provided a simple means for easily customizing decorative trim strips. For example, if a customer orders a pale blue car with navy and pale blue trim, pale blue body portion 20 would be affixed to a navy blue body portion 22 to provide an attractive, customized trim strip. For storage purposes, a plurality of separate body portions 20 can be stored. Similarly, a plurality of body portions 22 can be separately stored. These can then be combined as desired.

The impact resistant plastic material utilized in the constructions of body portions 20 and 22 should have sufficient rigidity to resist indentations and support the metallized decorative strips 34 and 36, yet be flexible enough to be conformed to the vehicle body surface 11. It is accordingly preferred that the rigidity of the plastic material used be in the range of 30–60 on the Shore "D" scale at ambient temperature.

Referring again to metallized decorative strips 34 and 36, the preferred material is aluminum in the form of aluminum foil, or a metallized plastic strip, but the selection here is of no consequence to the inventive feature herein. Indeed, the strips 34 and 36 may be omitted.

In the ebodiment illustrated, body portion 20 has a width of    inch and a thickness of 5/16 inch, and the body portion 22 has width of 1¼ inch and a thickness of 3/16 inch. These sizes are subject to variation, it being presently preferred to have the body portion 20 have a width in the range of ⅝ to ¾ inch and thickness of ¼ – ⅜ inch. The body portion 22 desirably has a width of ¾ to 1½ inch, and a width of ⅝ to ¼ inch.

While any one of a number of suitable pressure sensitive adhesive materials may be utilized in the practice of this invention, the preferred material is an elastomeric tape coated with a pressure-sensitive adhesive, as more fully described in U.S. Pat. No. 3,896,245.

Elastomeric adhesive layers 40 and 52 desirably have a thickness of at least 0.01 inch, preferably in the range of about 0.03 inch to about 0.08 inch and are coated with pressure sensitive adhesive to provide superior absorption of impact forces within each of the adhesive layers. As more fully explained in U.S. Pat. No. 3,896,245, the preferred adhesive layers are constituted by tacky and permanently compressible non-porous cohesive material having little or no resilience and constituted by elastomeric material compounded with from 0.45 to 2.5 times its weight of low volatile liquid plasticizer and at least 0.93 times its weight of finely divided solids, these solids including from 0.5 to 2½ parts, per part of elastomeric material, of finely divided bulk fibrous solids or solids that form thixotropic mixtures with the liquid plasticizer so that the adhesive layer can be deformed by pressure above about 15 psi, but exhibiting negligible flow at 0.6 psi.

While the invention has been described in connection with the preferred use of flexible and impact resistant plastics, it will be appreciated that the plastic can be reinforced, as with fibers, and even non-plastic materials can be used, such as aluminum.

What is claimed is:

1. A trim strip structure comprising: first and second adhesively bonded plastic longitudinal body portions, said first body portion having an upper surface and a lower surface, said second body portion having an upper surface which is adhesively bonded to the lower surface of said first body portion by means of a first resilient adhesive layer underlying the lower surface of said first body portion, said second body portion having a lower surface adapted to contact and be adhesively bonded to a surface of an article to be decorated, and a second resilient adhesive layer underlying the lower surface of said second body portion.

2. The trim strip structure of claim 1 wherein each of said adhesive layers has a thickness of at least 0.01 inch.

3. The trim strip structure of claim 1 wherein each of said adhesive layers has a thickness of from about 0.03 to about 0.08 inch.

4. The trim strip structure of claim 2 wherein said adhesive layers are elastomeric layers coated with pressure sensitive adhesive.

5. The trim strip structure of claim 1 wherein said trim strip additionally includes a strippable, non-adhesive layer underlying said second adhesive layer.

6. A trim structure comprising: first and second adhesively bonded laterally non-coextensive, longitudinal body portions, the first of said body portions having an upper surface and a lower surface, the second of said body portions being wider than said first body portion, said second body portion having an upper surface which is adhesively bonded to said lower surface of the first body portion by means of a first resilient adhesive layer underlying the lower surface of said first body portion, said second body portion having a lower surface adapted to contact and be adhesively bonded to a surface of an article to be decorated, and a second resilient adhesive layer underlying the lower surface of said second body portion.

7. The trim strip structure of claim 6 wherein each of said adhesive layers has a thickness of at least 0.01 inch.

8. The trim strip structure of claim 6 wherein each of said adhesive layers has a thickness of from about 0.03 to about 0.08 inch.

9. The trim strip structure of claim 6 wherein said first longitudinal body portion additionally includes first and second decorative, longitudinal sides strips.

10. The trim strip structure of claim 6 wherein said trim strip additionally includes a strippable, non-adhesive layer underlying said second adhesive layer.

11. The trim strip structure of claim 9 wherein each of said adhesive layers has a thickness of at least 0.01 inch.

12. The trim strip structure of claim 9 wheein each of said adhesive layers has a thickness of from about 0.03 to about 0.08 inch, and said body portions are plastic.

13. The trim strip structure of claim 9 wherein said trim strip additionally includes a strippable, non-adhesive layer underlying said second adhesive layer.

14. The trim strip structure of claim 11 wherein said trim strip additionally includes a strippable, non-adhesive layer underlying said second adhesive layer.

15. The trim strip structure of claim 12 wherein said trim strip additionally includes a strippable, non-adhesive layer underlying said second adhesive layer.

16. The trim strip structure of claim 4 wherein said elastomeric layers are constituted by tacky and permanently compressible nonporous cohesive material having little or no resilience and formed of elastomeric material compounded with from 0.45 to 2.5 times its weight of low volatile liquid plasticizer, and at least 0.93 times its weight of finely divided solids, said solids including from 0.5 to 2½ parts, per part of elastomeric material, of finely divided bulk fibrous solids or solids that form thixotropic mixtures with said plasticizer, so that the elastomeric layer can be deformed by pressure above about 15 psi but exhibiting negligible flow at 0.6 psi.

* * * * *

UNITED STATES PATENT OFFICE
CERTIFICATE OF CORRECTION

PATENT NO. : 4,010,297
DATED : March 1, 1977
INVENTOR(S) : Brian A. Wenrick

It is certified that error appears in the above-identified patent and that said Letters Patent are hereby corrected as shown below:

Col. 3, line 63, "embodiement" is misspelled

Col. 3, line 64, "width of inch" should read --width of 5/8 inch--

Col. 3, last line, before "thickness" insert --a--

Col. 4, line 2, "5/8" should be -- 1/8 --

Claim 6, line 1, after "trim" insert --strip--

Claim 12, line 1, "wheein" should read --wherein--

Signed and Sealed this

Third Day of May 1977

[SEAL]

Attest:

RUTH C. MASON
*Attesting Officer*

C. MARSHALL DANN
*Commissioner of Patents and Trademarks*